United States Patent [19]

Shirai et al.

[11] Patent Number: 4,794,427
[45] Date of Patent: Dec. 27, 1988

[54] IMAGE SCANNING APPARATUS

[75] Inventors: Masahiro Shirai, Tokyo; Motomu Fukasawa, Kawasaki, both of Japan

[73] Assignee: Canon Kabushiki Kaisha, Tokyo, Japan

[21] Appl. No.: 47,138

[22] Filed: May 8, 1987

[30] Foreign Application Priority Data

May 15, 1986 [JP] Japan ................................. 61-109604
Jun. 19, 1986 [JP] Japan ................................. 61-143556
Nov. 4, 1986 [JP] Japan ................................. 61-262116

[51] Int. Cl.$^4$ ............................................. G03B 27/70
[52] U.S. Cl. ......................................... 355/49; 355/66; 355/8; 355/11
[58] Field of Search ................... 355/45, 49, 66, 8, 11

[56] References Cited

U.S. PATENT DOCUMENTS 4,229,480 11/1981 Gilkeson et al. ................. 355/45 X Primary Examiner—L. T. Hix
Assistant Examiner—D. Rutledge
Attorney, Agent, or Firm—Fitzpatrick, Cella, Harper & Scinto

[57] ABSTRACT

An image scanning apparatus includes a focusing lens, a mirror for guiding light beams passing through the focusing lens onto a predetermined exposure position of a moving photosensitive drum, a moving unit for causing the mirror to move along a line intersecting a perpendicular bisector of a line segment connecting an imaginary focal plane of the focusing lens and the exposure position, and a rotating unit for changing an angle of the mirror upon movement of the mirror.

11 Claims, 5 Drawing Sheets

IMAGE SCANNING APPARATUS

FIELD OF THE INVENTION

The present invention relates to an image scanning apparatus suitable for a copying machine, a microfilm reader/printer and, more particularly, to an image scanning apparatus which is suitable for a case wherein an image is sequentially scanned on a drum-shaped photosensitive body surface which is being rotated or rotated and vibrated and has a curvature in a one-dimensional direttion, using a scanning mirror arranged on the side of an image field of a projection optical system, thereby projecting and focusing the image thereon.

DESCRIPTION OF RELATED BACKGROUND ART

In a conventional copying machine or a microfilm reader/printer, light beams from an original pass through a projection optical system and are sequentially scanned using a scanning mirror, thereby projecting and focusing an image on a rotating photosensitive drum.

A conventional image scanning apparatus which guides light beams passing through a projection optical system onto a photosensitive drum surface is disclosed in U.S. Pat. No. 4,299,480 and Japanese Patent Disclosure (Kokai) No. 55-126258.

In this conventional apparatus, scanning operation is performed by moving the scanning mirror while changing the inclination of the mirror, so that a distance from a reflection point of the light beams on the scanning mirror surface to an imaginary focal plane is equal to a distance to a reference point on the photosensitive drum. In this scanning method, good optical performance of a projected image formed on the photosensitive drum can be maintained, but the scanning orbit of the scanning mirror becomes nonlinear, resulting in a very complicated scanning mechanism.

More specifically, in order to perform optical scanning in the conventional apparatus, as shown in FIG. 1, a single scanning mirror 106 is disposed at a substantially intermediate position between a focusing lens 104 and an imaginary focal plane 105. Since the scanning mirror 106 must move in synchronism with the rotation speed of a photosensitive drum 107 while the reflection surface of the scanning mirror 106 always coincides with perpendicular bisectors of line segments connecting respective points on the imaginary focal plane 105 and a focal point D on the photosensitive drum 107, the orbit of the scanning mirror corresponds to curve SS'.

However, in the conventional apparatus, the image scanning apparatus for moving the scanning mirror is arranged so that the scanning mirror is moved by a slidable link member while linking with a pupil position of the lens or a portion corresponding to the exposure position on the photosensitive drum, the apparatus becomes bulky, and the margin of an actual optical arrangement is decreased.

Another method is proposed wherein the scanning mirror is rotated to perform scanning without moving it. With this method, an optical path difference is generated, and a reproduced image on a photosensitive drum surface may cause a barrel-like or trapezoidal distortion.

SUMMARY OF THE INVENTION

It is a object of the present invention to provide a simple image scanning apparatus which scans light beams passing through a projection optical system using a single scanning mirror, and with which even if the scanning mirror linearly scans when an image is projected and focused on a photosensitive drum having a curvature in a one-dimensional direction, a high-quality image output having a small distortion, e.g., 1% or less, can be obtained.

It is another object of the present invention to render an apparatus compact by omitting a member for linking a scanning mirror, a focusing lens, and a photosensitive drum and to increase a margin of an optical arrangement.

In order to achieve the above object, according to the present invention, there is provided an image scanning apparatus in which a single scanning mirror disposed between a focusing lens and a focal plane is moved to perform optical scanning, wherein the scanning mirror has a linear scanning orbit, and a rotation angle of the scanning mirroriis controlled in accordance with a displacement of the scanning mirror.

DETAILED DESCRIPTION OF THE PREFERRED EMBODIMENTS

Figure 2:
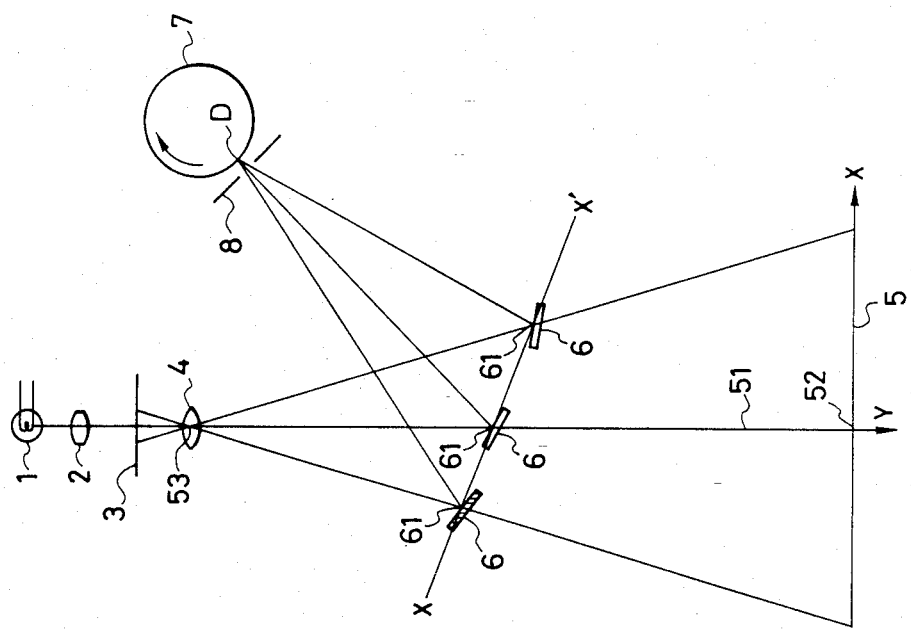
FIGS. 2 and 3 are schematic views for explaining the principle of an image scanning apparatus according an embodiment of the present invention.
Figure 3:
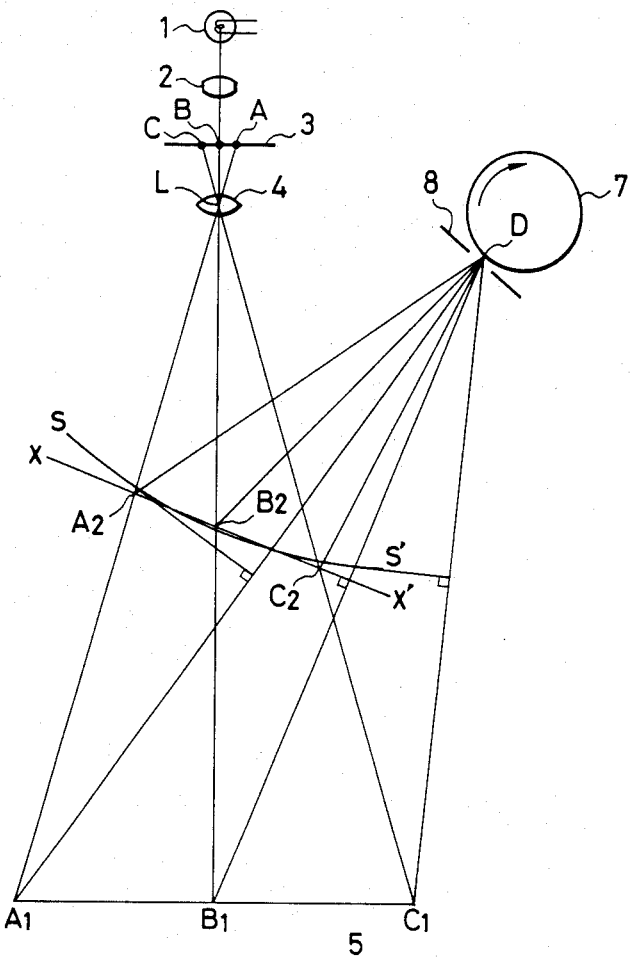

The present invention will now be described with reference to illustrated embodiments. FIGS. 2 and 3 are schematic views for explaining the principle of an image scanning apparatus according to an embodiment of the peesent invention. Referring to FIGS. 2 and 3, a microfilm 3 is irradiated with light beams emitted from an illumination lamp 1 through a condenser lens 2, and an image on the microfilm 3 is projected onto an imaginary focal plane 5 through a focusing lens 4. Note that a slit 8 is arranged to oppose a photosensitive drum 7.

In this case, on the image surface of the microfilm 3, a point B along the optical axis of a lens 4, and points A and C at both sides thereof are focused at points $B_1$, $B_2$, and $B_3$ on the imaginary focal plane 5, respectively. When a single scanning mirror 6 is disposed at a substantially intermediate position between the lens 4 and the imaginary focal plane 5 so that the focusing beams are reflected by the scanning mirror 6 to be focused on the surface of the photosensitive drum 7, a distance from the scanning mirror 6 to the imaginary focal plane 5 must be equal to a distance from the scanning mirror 6 to a focal point D on the photosensitive drum 7.

Therefore, in order to perform optical scanning, the scanning mirror 6 must be moved in synchronism with the rotation speed of the photosensitive drum 7 so that the reflection surface of the scanning mirror 6 coincides with perpendicular bisectors of line segments connecting points on the imaginary focal plane 5 and the focal point D on the photosensitive drum 7. Therefore, the orbit of the scanning mirror 6 corresponds to curve SS'. Although the shape magnitude of the curve SS' varies depending on the position of the photosensitive drum 7, when the scanning mirror 6 is located relatively adjacent to the lens 4, and the photosensitive drum 7 is located to be separated away from the imaginary focal plane 5 and adjacent to the lens 4, as shown in FIGS. 2 and 3, the curve SS' can be substantially regarded as a line. For this reason, a method can be proposed wherein the scanning mirror 6 is moved along the linear orbit to perform scanning. In this case, the scanning operation must be performed while rotating the angle of the scanning mirror 6 and changing the moving speed to be synchronized with the photosensitive drum 7 rotating at a constant speed, so that the light beams passing through the lens 4 are focused on the photosensitive drum 7 at all the positions within an image area along the linear orbit.

Upon determination of an actual linear orbit, a linear regression line with which a minimum optical path length drift can be provided at arbitrary positions with respect to an orbit formula of a curve that does not cause an optical path difference is given as a linear scanning orbit. In general, a projection lens for a microfilm used in a reader/printer has advantages such as a smaller field angle and a larger focal depth than those used in a copying machine. Therefore, the projection lens will not suffer from the influence of an optical path drift caused by the linear orbit.

In this invention, the scanning mirror 6 is moved along a line crossing the curve SS' at least two intersections or a tangent of the curve SS', e.g., line XX' indicated by the solid line in FIGS. 2 and 3.

In this embodiment, if a distance from the imaginary focal plane 5 to an exit pupil 53 of the focusing lens 4 is given by d, respective components are arranged so that the respective points on the imaginary focal plane 5 can be focused on the surface of the photosensitive drum 7 upon scanning of the scanning mirror 6 to fall within the circle of a radius b/100, thereby reducing a distortion. If the focal points fall outside the circle of radius b/100, a distortion caused by an optical path length drift increases, and any correction means is necessary.

In this embodiment, the above-mentioned scanning method is adopted wherein the single scanning mirror 6 is moved along the line XX' specified described above, thereby simplifying the scanning mechanism. Then, a distortion of a projection image formed on the surface of the photosensitive drum 7 is eliminated. For example, respective elements are specified like coordinate points to be described later, so that a distortion of the projection image on the surface of the photosensitive drum 7 is reduced to 1% or less.

Assume that the optical axis direction of the focusing lens 4 is given as a Y-axis and the scanning direction on the imaginary focal plane 5 is given as an X-axis, and an intersection 52 with an optical axis 51 of the focusing lens 5 on the imaginary focal plane 5 is given as an origin (0,0), as shown in FIG. 2. The coordinates of an exit pupil position 53 are given as (0,b), the coordinates of a reflection point of the scanning mirror 6 along the optical axis 51 of the focusing lens 4 are given as (0,a), and the coordinates of the focal point D of the photosensitive drum 7 are given as (c,d).

When the coordinate points of the respective elements are set for 5 parameters, i.e., I to V, as shown in Table 1 below, the formula of the line XX' described above corresponds to the formulas of linear orbit as indicated by I to V in Table 2.

Figure 4:
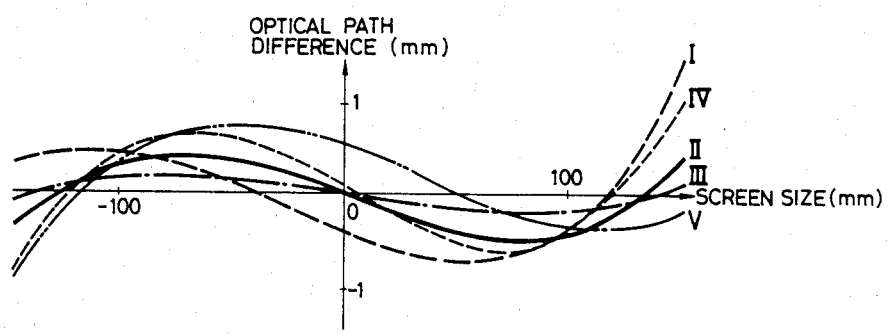
FIG. 4 is a view for explaining an optical path difference of scanning mirrors in respective embodiments of the present invention.

In this case, a difference between a distance from the reflection point 61 of the scanning mirror 6 to the imaginary focal plane and a distance to the focal point on the photosensitive drum 7, i.e., an optical path difference $\Delta$ can be obtained, as shown in FIG. 4.

As indicated by curves I to V in FIG. 4, in each embodiment, the optical path difference $\Delta$ is a maximum of about 1 mm. This value corresponds to b/1000 or less, and a distortion in this embodiment is 0.1% or less. Therefore, in this embodiment, no correction is necessary for distortion.

The optical path difference of this extent can allow a satisfactorily good optical performance since a focal depth of a projection optical system used in a microfilm reader/printer is ten times the value described above.

TABLE 1

|     | a   | b    | c   | d   |
| --- | --- | ---- | --- | --- |
| I   | 500 | 1000 | 500 | 500 |
| II  | 500 | 1000 | 410 | 787 |
| III | 500 | 1000 | 171 | 970 |
| IV  | 500 | 1050 | 410 | 787 |
| V   | 500 | 950  | 410 | 787 |

TABLE 2

| I   | y = −0.9725x + 499.9 |
| --- | -------------------- |
| II  | y = −0.5097x + 500.0 |
| III | y = −0.1730x + 500.0 |
| IV  | y = −0.5097x + 500.3 |
| V   | y = −0.5092x + 499.7 |

In this embodiment, when the scanning mirror is moved along a line obtained by linearly regressing the curve SS', a less distorted image can be preferably obtained.

Figure 10:
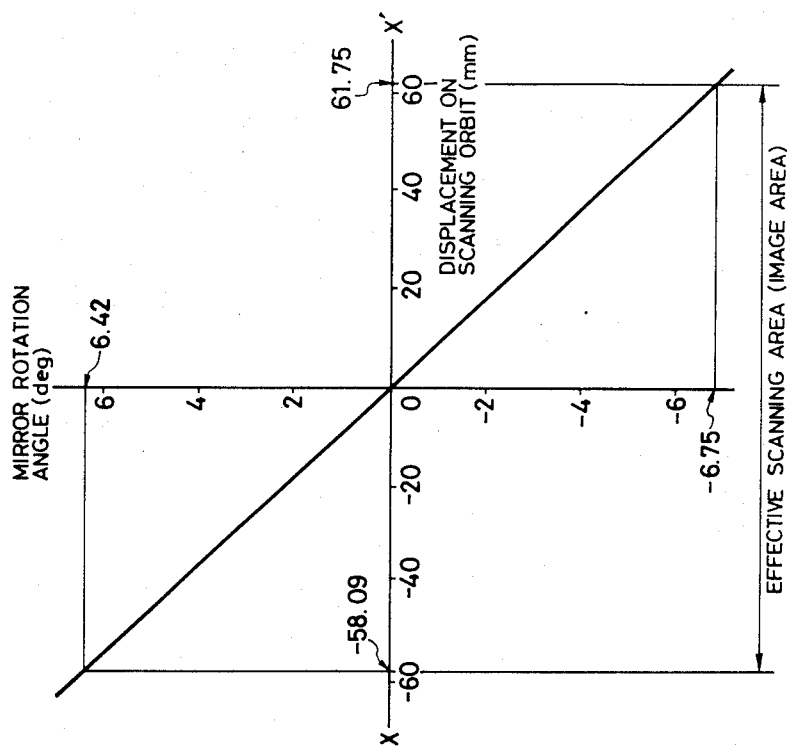
FIG. 10 is a view showing the relationship between a displacement of the scanning mirror along a linear scanning orbit and an angle formed by a reflection surface and the linear scanning orbit at that time in each embodiment.

FIG. 10 shows the relationship between a displacement of the scanning mirror on the line and a displacement in angle when a linear scanning orbit is defined as the line XX' passing through a point separated from the focal plane on the optical axis by a distance of 650 mm and forms an angleoof 12.5° with the focal plane. In this case, the reflection surface of the scanning mirror is rotated through a given angle in a predetermined direction in accordance with the displacement of the scanning mirror 6 along the scanning direction. A scanning speed of the scanning mirror 6 cannot be theoretically constant as long as the scanning line is not set to be parallel to the focal plane. When the inclination of the scanning line is small as in this embodiment, even if the scanning mirror scans at a constant speed, there is no influence.

Figure 5:
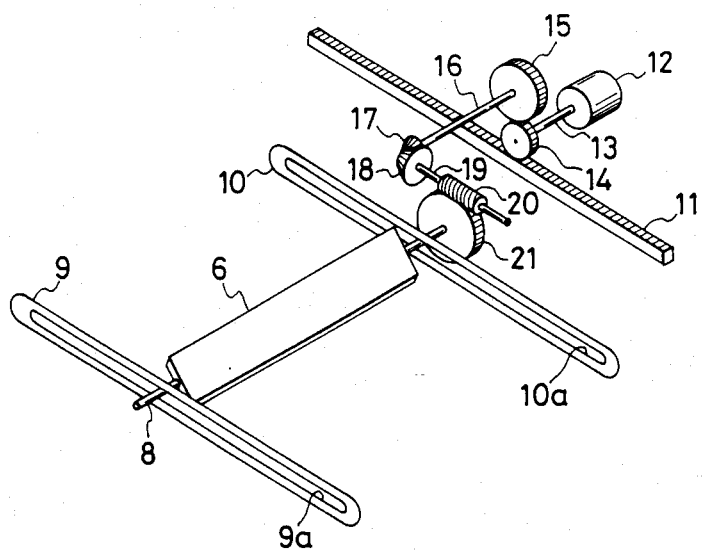
FIG. 5 is a perspective view showing the detailed arrangement of the present invention.

A detailed apparatus for moving the scanning mirror 6 as described above to perform scanning is shown in FIG. 5. Referring to FIG. 5, guide rail members 9 and 10 are arranged at both sides of the scanning mirror 6 to coincide with the linear scanning orbit XX'. Support members 8 are mounted on two nnds of the scanning mirror 6, and are guided by guide holes 9a and 10a of the guide rail members 9 and 10, respectively, thereby moving the scanning mirror 6. A rack 11 is arranged so that its pitch line coincides with or is parallel to the linear scanning orbit XX'. A motor 12 serves as a drive source. A gear 14 is fitted on a shaft 13 of the motor 12. The gear 14 is meshed with the rack 11 and is also meshed with a gear 15. The gear 15 is coupled to a bevel gear 17 via a connecting shaft 16. The bevel gear 17 is meshed with a bevel gear 18. The bevel gear 18 is fitted on one end of a shaft 19 of a worm 20. The worm 20 is meshed with a worm wheel 21, which is mounted on one support member 8.

Figure 6:
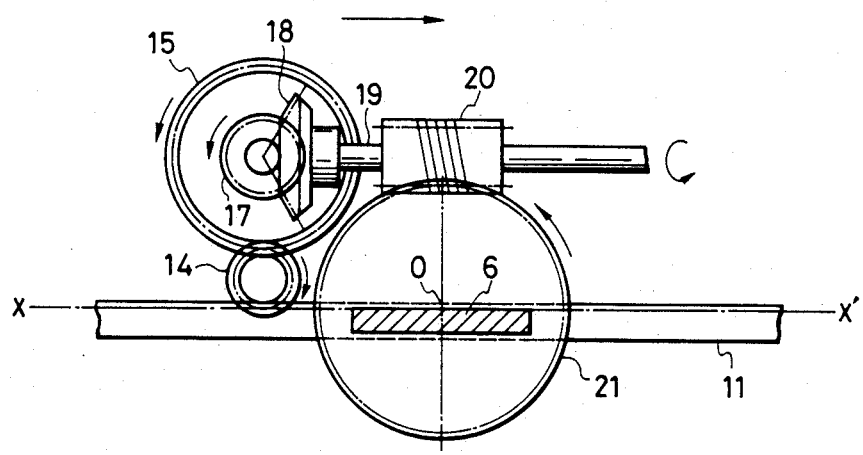
FIG. 6 is a view showing the main part of FIG. 5.

In the above arrangement, when the motor 12 is driven, the gear 14 is moved, while being rotated, in the scanning direction on the rack 11 arranged on or parallel to the linear scanning orbit XX', and the scanning mirror 6 is moved along the linear orbit. In accordance with this displacement of the mirror 6, the worm wheel 21 coupled to the scanning mirror is rotated, thereby changing the inclination of the reflection surface of the scanning mirror 6. FIG. 6 shows the main part of the arrangement shown in FIG. 5. The rotation angle of the scanning mirror 6 is very small as compared to the displacement thereof in the scanning direction. For this reason, the number of teeth of the gear 14 is decreased to be smaller than that of the gear 15, and the decelerated rotation of the gear 14 is transmitted to the worm wheel 21. Referring to FIG. 6, the center 0 of the reflection surface of the scanning mirror 6 is arranged to always be located on the linear scanning orbit XX'.

In this embodiment, control for the scanning mirror when the linear scanning orbit is set at a specific position has been described. However, if the linear scanning orbit XX' is set at different positions, the gear ratio of the gears can be changed to obtain an appropriate rotation angle of the scanning mirror corresponding to the displacement along the scanning direction.

In this embodiment, therefore, the scanning orbit of the scanning mirror 6 is approximately regarded as a line within an allowance of a geometrical optical path difference, and the rack 11 is arranged on the linear scanning orbit or a line parallel thereto to linearly move the scanning mirror 6. The rotation angle of the scanning mirror 6 is controlled by a reduction gear mechanism, for the rack 11, constituted by the gears 14 and 15, the bevel gears 17 and 18, the worm 20, and the worm wheel 21.

Figure 7:
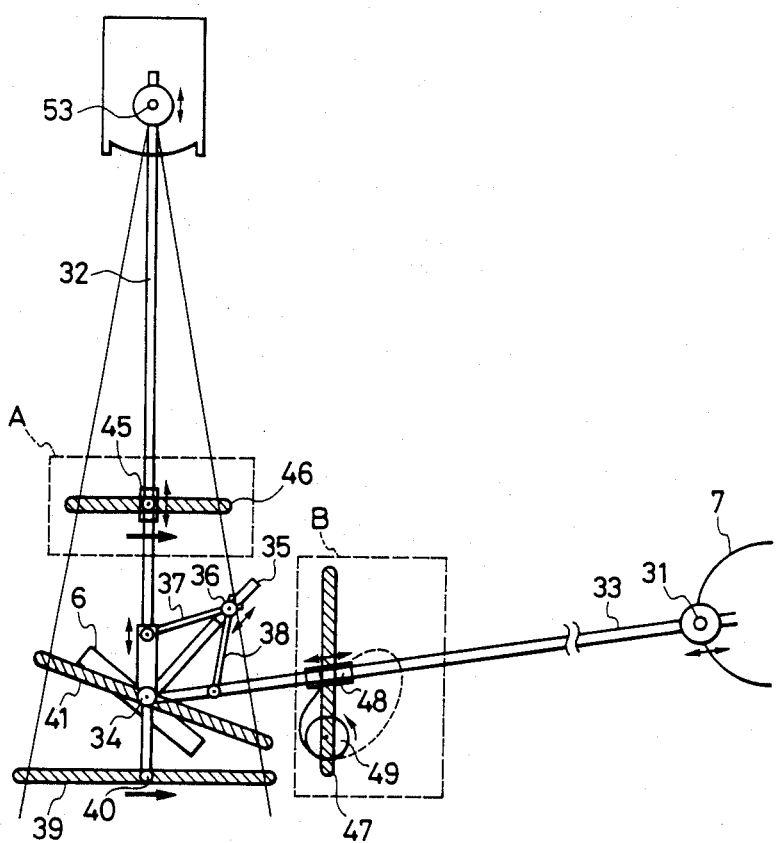
FIGS. 7 and 8 are views showing arrangements according to other embodiments of the present ineention.

FIG. 7 is a schematic view showing another embodiment for driving the scanning mirror 6. Referring to FIG. 6, 53 indicates an exit pupil point of a focusing lens 4, 31 indicates a reference point (a focal point) on a photosensitive drum, and 40 indicates an origin on an imaginary focal plane.

Rod members 32 and 33 which are pivotal and are inwardly slidable are arrange at the exit pupil point 53 and the reference point 31, respectively, and a pivotal scanning mirror 6 is arranged at an intersection 34 of these rod members 32 and 33. A guide rod 35 is fixed to the scanning mirror 6 to extend in a direction perpendicular to the mirror 6, and a slider 36 is inserted through the guide rod 35.

Drive links 37 and 38 are arranged on the slider 36 so that the guide rod 35 can be moved along a bisector of an angle formed by the two rod members 32 and 33. The drive link 37 also moves the rod member 32 extending from the exit pupil point 53 to a drive portion 40 which slides along the interior of a drive guide groove 39 formed on the imaginary focal plane.

The direction along which the rod member 32 is located corrssponds to a direction of a principal beam that is emerged from the focusing lens 4 and is incident on the scanning mirror 6, and the direction along which the rod member 33 is located corresponds to the direction of the principal beam reflected by the scanning mirror 6.

When the scanning mirror 6 is moved along a linear orbit 41 while changing its inclination, beam scanning can be performed.

In this embodiment, in order to render the overall apparatus compact, a slider 45 and a drive guide groove 46 are arranged as indicated in a broken-line frame A, or a slider 48 is arranged in a vertical drive guide groove 47 a indicated in a broken-line frame B while synchronizing the vertical operations using a cam 49. In this case, the shape of the cam is determined as follows. If the guide groove 47 in FIG. 7 is given as x=e and the linear orbit 41 is given as y=px+q in synchronism with an image portion μ from the reference point 31 on the imaginary focal plane 5 using the coordinate system shown in FIG. 2, the y-coordinate on x=e can be expressed as a function of μ. Thus, the shape of the cam 49 can be determined in synchronism with the rotation angle thereof. Then, the following relation can be obtained:

$$y(\mu) = \frac{p\mu(b-d) - b(d-q)}{p\mu(b-q-c) - bc}(e-c) + d$$

With this relation, the light beam reflected by the scanning mirror 6 can be reflected by a stationary mirror at an arbitrary timing, an elongated rod-like space is not necessary, and the overall apparatus can be rendered compact.

Alternatively, the orbit can be set as follows. The scanning mirror 6 is controlled so that its inclination is changed along the guide groove. Then, the scanning mirror can be moved along the guide groove while the normal of the scanning mirror maintains an angle given by the following relation with respect to the orbit at discrete scanning positions:

$$\#/4 - \tan^{-1}p + \tfrac{1}{2}(\tan^{-1}(px+q-d)/(x-c) + \tan^{-1}(-b-y)/x)$$

In the embodiment shown in FIG. 5, angular control for the reflection surface of the scanning mirror is performed by a reduction gear mechanism constituted by a rack arranged on the linear scanning orbit of the scanning mirror or on a line parallel thereto, and a series of gears meshed therewith. Therefore, an error in angle of the reflection surface which must be accurately determined caused by a back-rush of respective gears occurs to cause step-out, or a reduction gear ratio is too large to increase the diameters of the gears, and to increase the number of gears, resulting in a bulky and complicated apparatus.

The scanning mirror can be approximately moved at a constant speed along a line only when the inclination of a preset linear scanning orbit is relatively small. Therefore, this method cannot be adopted if the inclination of the linear scanning orbit is large.

Figure 8:
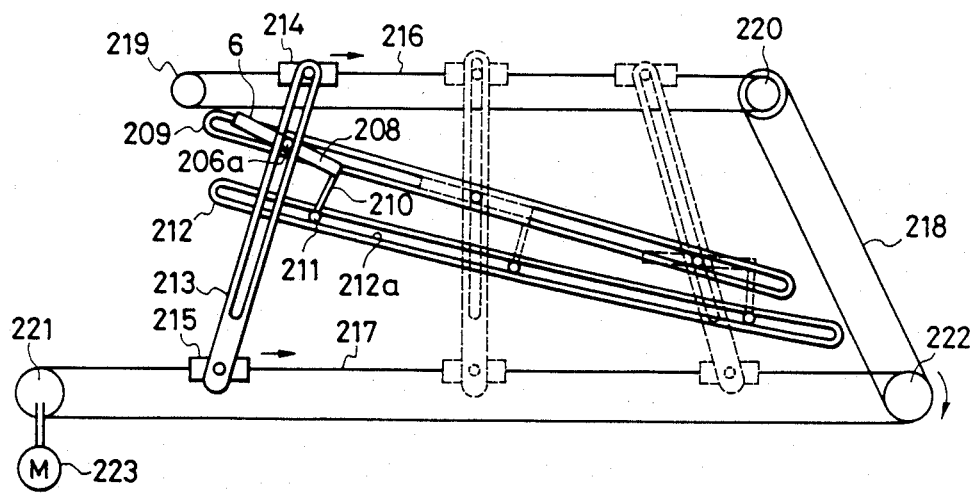

The embodiment shown in FIG. 8 can eliminate the above problems, and angular control of the reflection surface of the scanning mirror can be performed without using the gear mechanism. In addition, appropriate speed control of the scanning mirror on the line can be performed regardless of the inclination of the linear scanning orbit.

The structure according to the embodiment shown in FIG. 8 includes a rotating shaft 206a of a scanning mirror 6, a support member 208 for the scanning mirror 6, a linear guide member 209, a support arm 210 fixed to the support member 208, a slider 211 mounted on the distal end of the support arm 210, a linear (or arcuated) guide member 212 along which the slider 211 slides, a linear guide member 213 along which the rotating shaft 206a of the scanning mirror 6 is slidable, moving members 214 and 215 which are mounted on the guide member 213 and are moved parallel to each other at constant speeds respectively, a wire 216 looped between pulleys 219 and 220, a wire 218 looped between pulleys 220 and 222, and a motor 223 for rotating the pulley 221.

Figure 1:
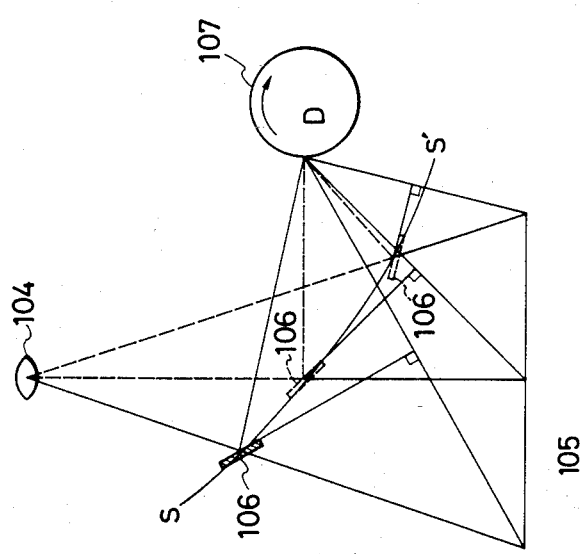
FIG. 1 is a schematic view of a conventional image scanning apparatus.

In this structure, when the motor 223 is driven, the moving members 214 and 215 are moved at predetermined speeds respectively through the wires 217, 218 and 216. The scanning mirror 6 is moved while sliding along the linear guide member arranged on the linear scanning orbit XX' shown in FIG. 1. In this case, the support arm 210 fixed to the support member 208 of the scanning mirror 6 slides along the guide member 212, and the inclination of the reflection surface of the scanning mirror 6 is gradually changed upon its movement in the scanning direction, and its rotation speed is also changed. In this embodiment, the shapes and the setting positions of the support arm 210 and the guide member 212 are determined so as to satisfy the relationship shown in FIG. 10.

The linear scanning orbit XX' is not parallel to the imaginary focal plane 5 but is inclined with respect thereto. For this reason, the equi-distant pitches on the imaginary focal plane 5 are disordered on the scanning image area of the scanning mirror 6. If the scanning mirror 6 is moved at a constant speed on the scanning image area, since the displacements vary according to different pitches, step-out on a reproduced image occurs with respect to a photosensitive drum 7 which is rotated at a constant speed. Therefore, as the scanning mirror 6 comes closer to the imaginary focal plane 5 in the scanning direction, it must be moved while being gradually accelerated.

However, from the geometrically symmetrical conditions, in a direction parallel to the imaginary focal plane 5, the speed of the scanning mirror 6 becomes constant in proportion to the moving speed of the imaginary focal plane 5, i.e., the peripheral velocity of the photosensitive drum 7.

In this embodiment, the moving members 214 and 15 are moved at predetermined speeds in accordance with their setting positions in a direction parallel to the imaginary focal plane 5 by means of the wires 216, 217, and 218, and the pulleys 219, 220, 221, and 222. Thus, the moving speed of the scanning mirror 6 can be changed during its movement. The rotation speed of the scanning mirror 6 is changed during its movement by the moving members coupled to the wires 216 and 217 and the guide member 212 on which the guide groove 212a is formed, thereby forming an image without step-out or misalignment on the photosensitive drum 7.

Figure 9:
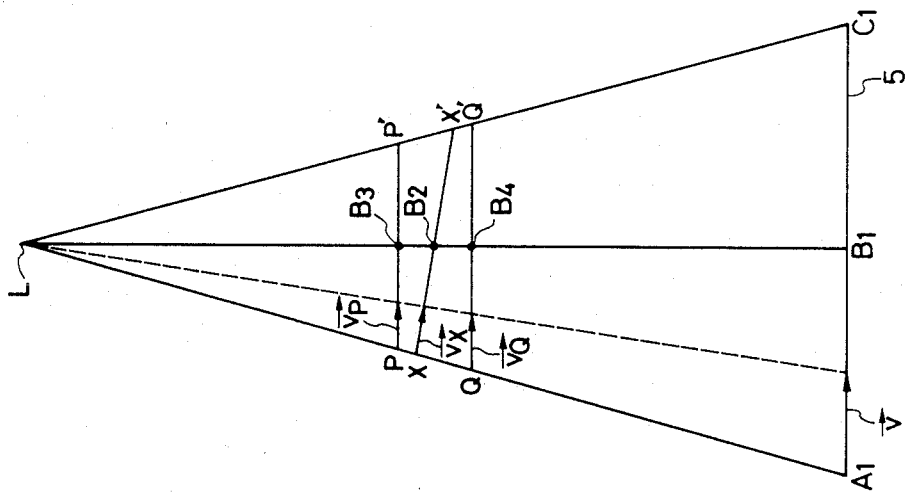
FIG. 9 is a view for explaining the scanning principle of the scanning mirror in the embodiment shown in FIG. 8.

FIG. 9 is a view showing the scanning principle of the scanning mirror in this embodiment. Lines PP' and QQ' parallel to the imaginary focal plane 5 are formed at two sides of the linear scanning orbit XX'. Points $B_2$, $B_3$, and $B_4$ are plotted along the linear scanning orbit XX' and the lines PP' and QQ', respectively, and indicate setting positions of these lines on the optical axis. A moving speed vector of the imaginary focal plane 5 is indicated by $\vec{v}$, and $\vec{v}_P$, $\vec{v}_Q$, and $\vec{v}_X$ are respectively speed vector on the lines PP', QQ', and XX' corresponding the speed vector $\vec{v}$. In FIG. 9, from the triangularly symmetrical conditions, the following relation is yielded:

$$\vec{v}_P : \vec{v}_Q : \vec{v} = \overline{LB}_3 : \overline{LB}_4 : \overline{LB}_1 = L_1 : L_2 : L$$

Where $L_1$, $L_2$, and L are distances from the pupil point of the focusing lens 4, respectively. Therefore, $$\vec{v}_P = \frac{\overline{LB}_3}{\overline{LB}_1} \vec{v} \left( = \frac{L_1}{L} V \right), \vec{v}_Q = \frac{\overline{LB}_4}{\overline{LB}_1} \vec{v} \left( = \frac{L_2}{L} V \right)$$

If the diameters of the pulleys 219 and 220 and the pulleys 221, and 222 or the rotation speed of the drive motor 223 can be determined so as to satisfy the above relation, the vector $\vec{v}_X$ can be determined by the above-mentioned scanning mechanism.

In this embodiment, scanning mirror control when the linear scanning orbit XX' is set at a specific position has been exemplified. However, the present invention is not limited to this. Even if the linear scanning orbit XX' is set at different positions, the shape and setting position of the guide member 212 can be changed so as to satisfy the movement of the scanning mirror at that time, thereby obtaining proper angular control. In the above embodiment, when the diameters of the pulleys 219 and 220 and the pulleys 221 and 222 or the setting positions thereof are changed, appropriate speed control can be achieved.

In the above embodiment, as for the angular control of the reflection surface of the scanning mirror 6, the support arm 210 is mounted on the support member 208 of the scanning mirror 6, and the linear or arcuate guide member 212 along which the slider 211 of the support arm 210 slides is arranged, so that the accurate and stable continuous displacement of the scanning mirror 6 can be obtained with a simple arrangement.

In the above embodiment, even if the linear scanning orbit is set at any position or is set to have any inclination within the possible linear scanning range, the scanning mirror can be scanned at an appropriate scanning speed by using a drive motor which is rotated at a constant speed. Therefore, a margin for setting the linear scanning orbit can be enhanced.

In the embodiment shown in FIG. 8, the moving members which are coupled to the scanning mirror and cause the scanning mirror to be moved at a predetermined speed is arranged at two sides of the linear scanning orbits, and the support arm is mounted on the scanning mirror and is moved along the guide member. With this structure, the angle of the reflection surface of the scanning mirror is controlled. Therefore, the angular control of the reflection surface of the scanning mirror can be performed without using the gear mechanism, and the overall apparatus can be rendered compact and simple. In addition, appropriate speed control can be attained regardless of the inclination of the linear scanning orbit, and as a result, a clear reproduced print image can be advantageously obtained.

What is claimed is:
1. An image scanning apparatus comprising:
a focusing lens;
a mirror for guiding light beams passing through said focusing lens onto a predetermined exposure position of a moving photosensitive body;

moving means for causing said mirror to move along a line intersecting a perpendicular bisector of a line segment connecting an imaginary focal plane of said focusing lens and the exposure position;

rotating means for changing an angle of said mirror upon movement of said mirror; and said moving means having a rotatable support member supporting said mirror and drive means for moving said support member along a guide surface parallel to said line.

2. An apparatus according to claim 1, wherein said rotating means receives a drive force transmitted from said drive means, and rotates said support member upon movement of said support member.

3. An image scanning apparatus comprising:

a focusing lens;

a mirror for guiding light beams passing through said focusing lens onto a predetermined exposure position of a moving photosensitive body;

moving means for causing said mirror to move along a line intersecting a perpendicular bisector of a line segment connecting an imaginary focal plane of said focusing lens and the exposure position;

rotating means for changing an angle of said mirror upon movement of said mirror; and said line crosses at least two points of an orbit defined by intersections of perpendicualr bisectors of line segments connecting respective points on said imaginary focal plane and said exposure position, and principal light beams of the light beams incident on the respective points on said imaginary focal plane.

4. An image scanning apparatus comprising:

a focusing lens; through a mirror for guiding light beams passing said focusing lens onto a predetermined exposure position of a movnng photosensitive body;

moving means for causing said mirror to move along a line intersecting a perpendicular bisector of a line segment connecting an imaginary focal plane of said focusing lens and the exposure position;

rotating means for changing an angle of said mirror upon movement of said mirror; and said line is a tangent wiht respect to an orbit defined by intersections of perpendicular bisectors of line segments connecting respective points on said imaginary focal plane and said exposure position, and principal light beams of the light beams incident on the respective points on said imaginary focal plane.

5. An image scanning apparatus comprising:

a focusing lens;

a mirror for guiding light beams passing through said focusing lens onto a predetermined exposure position of a moving photosensitive body;

moving means for causing said mirror to move along a line intersecting a perpendicular bisector of a line segment connecting an imaginary focal plane of said focusing lens and the exposure position;

rotating means for changing an angle of said mirror upon movement of said mirror; and said moving means having a rotatable support member supporting said miroor and drive means for moving said support member along a first guide surface parallel to said line; and said rotating means having a movable member which is movable along a second guide surface which is not parallel to said first guide surface and is connected to said support member, said movable member being moved to be interlocked with said support member so as to rotate said support member upon its movement.

6. An apparatus according to claim 5, wherein said moving means increases a moving speed of said support member as said mirror comes closer to said imaginary focal plane.

7. An apparatus according to claim 5, wherein said apparatus further includes a first moving member which is located at a position separated by a distance $L_1$ from a pupil position of said focusing lens, and a second moving member which is located at a position separated by a distance $L_2$ from said pupil position and is moved parallel, and a coupling member, one end of which is moved integrally with said first moving mebber and the other end of which is moved integrally with said second moving member, said support member being moved to be interlocked with the movement of said coupling member.

8. An apparatus according to claim 7, wherein if a moving speed of said photosensitive body is given as V and a distance between said pupil position and said imaginary focal plane is given as L, said first moving member is moved at a speed of $(L_1/L)V$ and said second moving member is moved at a speed of $(L_2/L)V$.

9. An image scanning apparatus comprising:

a focusing lens;

a mirror for guiding light beams passing through said focusing lens onto a predetermined exposure position of a moving photosensitive body;

moving means for causing said mirror to move along a line intersecting a perpendicular bisector of a line segment connecting an imaginary focal plane of said focusing lens and the exposure position;

rotating means for changing an angle of said mirror upon movement of said mirror; and said moving means having speed control means for chancing the moving speeds of said mirror during movement of said mirror, and said rotating means having rotation speed control means for changing the rotation speed of said mirror.

10. A slit exposure apparatus for projecting an image of an original onto a moving photosensitive body, comprising:

a focusing lens;

a rotatable plane mirror for reflecting light beams passing through said focusing lens onto said photosensitive body;

moving emans for moving said mirror along a line intersecting at two points or contacting an arcuated orbit defined by intersections of perpendicular bisectors of line segments connecting points of an imaginary focal plane of said focusing lens and an exposure position of said photosensitive body and principal light beams of light beams incident on the respective points on said imaginary focal plane;

rotating means for controlling an angle of said mirror upon movement of said mirror; and control means for changing a moving speed and a rotationspeed of said mirror during movement of said mirror.

11. A slit exposure apparatus for projecting an image of an original onto a moving photosensitive body, comprising:

a focusing lens:

a rotatable plane mirror for reflecting light beams passing through said focusing lens onto said photosensitive body;

moving means for causing said mirror along a line intersecting at two points or contacting an arcuated orbit defined by intersections of perpendicular bisectors of line segments connecting points on an imaginary focal plane of said focusing lens and the exposure position of said photosensitive body and principal light beams of light beams incident on the respective points on said imaginary focal plane;

rotating means for controlling an angle of said mirror upon movement of said mirror; and the original is a microfilm, and said photosensitive body is a photosensitive drum which is rotated at a constant speed.

* * * * *

UNITED STATES PATENT AND TRADEMARK OFFICE
CERTIFICATE OF CORRECTION

PATENT NO. : 4,794,427

DATED : December 27, 1988

INVENTOR(S) : MASAHIRO SHIRAI, ET AL.

It is certified that error appears in the above-identified patent and that said Letters Patent is hereby corrected as shown below:

COLUMN 1

Line 12, "direttion" should read --direction--.

COLUMN 2

Line 18, "mirroriis" should read --mirror--.
Line 51, "peesent" should read --present--.

COLUMN 4

Line 49, "angleoof" should read --angle of--.
Line 65, "two nnds" should read --two ends--.

COLUMN 5

Line 17, "mirror is" should read --mirror 6 is--.

COLUMN 7

Line 49, "members 214 and 15" should read --members 214 and 215--.

COLUMN 8

Line 3, "speed vector $v_{\rightarrow}^{!}$" should read --speed vector $\vec{v}$--.

UNITED STATES PATENT AND TRADEMARK OFFICE
CERTIFICATE OF CORRECTION

PATENT NO. : 4,794,427

DATED : December 27, 1988

INVENTOR(S) : MASAHIRO SHIRAI, ET AL.

It is certified that error appears in the above-identified patent and that said Letters Patent is hereby corrected as shown below:

COLUMN 9

Line 34, "through" should be deleted.
Line 35, "passing said" should read --passing through said--.
Line 37, "movnng" should read --moving--.
Line 44, "wiht" should read --with--.

COLUMN 10

Line 15, "mebber" should read --member--.
Line 38, "chancing" should read --changing-- and "speeds" should read --speed--.
Line 49, "emans" should read --means--.
Line 60, "rotationspeed of" should read --rotation speed of--.

UNITED STATES PATENT AND TRADEMARK OFFICE
CERTIFICATE OF CORRECTION

PATENT NO. : 4,794,427
DATED : December 27, 1988
INVENTOR(S) : MASAHIRO SHIRAI, ET AL.

Page 3 of 3

It is certified that error appears in the above-identified patent and that said Letters Patent is hereby corrected as shown below:

COLUMN 11

Line 1, "causing" should read --moving--.

Signed and Sealed this

Twenty-fourth Day of July, 1990

Attest:

HARRY F. MANBECK, JR.

*Attesting Officer*  *Commissioner of Patents and Trademarks*